(12) United States Patent
Schwarzbich

(10) Patent No.: US 7,287,905 B2
(45) Date of Patent: Oct. 30, 2007

(54) LUGGAGE NET

(76) Inventor: Jörg Schwarzbich, Wertherstrasse 15, Bielefeld (DE) D-33615

( * ) Notice: Subject to any disclaimer, the term of this patent is extended or adjusted under 35 U.S.C. 154(b) by 576 days.

(21) Appl. No.: 10/489,188

(22) PCT Filed: Sep. 13, 2002

(86) PCT No.: PCT/EP02/10289

§ 371 (c)(1),
(2), (4) Date: Mar. 8, 2004

(87) PCT Pub. No.: WO03/031231

PCT Pub. Date: Apr. 17, 2003

(65) Prior Publication Data

US 2004/0247209 A1    Dec. 9, 2004

(30) Foreign Application Priority Data

Oct. 5, 2001    (DE) .................... 101 49 103

(51) Int. Cl.
*B60R 7/00* (2006.01)
*B65D 30/06* (2006.01)

(52) U.S. Cl. .............. 383/117; 224/563; 224/275

(58) Field of Classification Search ........ 383/117, 383/118; 224/275, 572, 563; 220/9.1–9.3
See application file for complete search history.

(56) References Cited

U.S. PATENT DOCUMENTS 1,410,819 A * 3/1922 McNemar ............ 81/15.7
5,402,924 A * 4/1995 Gilson ................ 224/312
5,542,591 A   8/1996 Moore et al.

FOREIGN PATENT DOCUMENTS

| DE | 1758915 | 12/1957 |
|----|---------|---------|
| DE | 1280696 | 10/1968 |
| DE | 1430612 | 5/1969 |
| DE | 7231852 | 11/1972 |
| DE | 7317863 | 8/1973 |
| DE | 2242472 | 3/1974 |
| DE | 2324200 | 11/1974 |
| DE | 2938357 | 4/1981 |
| DE | 8601047.6 | 2/1986 |
| DE | 3447179 C1 * | 7/1986 |
| EP | 0288386 | 10/1988 |

* cited by examiner

*Primary Examiner*—Nathan J. Newhouse
*Assistant Examiner*—Jack Morgan
(74) *Attorney, Agent, or Firm*—Richard M. Goldberg

(57) ABSTRACT

A luggage rack having a support member (10) and an mesh structure (14) arranged in parallel with the support member and being formed by net strings (16) that are attached to the support member (10) at closed edges of the luggage rack, characterized in that the net strings (16) are drawn into holes (18) of the support member and are attached in these holes or beyond said holes on the back side of the support member (10).

6 Claims, 4 Drawing Sheets

LUGGAGE NET

BACKGROUND OF THE INVENTION

The invention relates to a luggage rack having a support member and a mesh structure arranged in parallel with the support member and being formed by net strings that are fixed to the support member at closed edges of the luggage rack.

Such luggage racks are frequently provided at the back side of the seat back of vehicle seats. Then, the support member is in most cases formed by a plastic molding which forms the back wall of the seat back or at least a part of this back wall.

For attaching the mesh structure at the support member, there is conventionally used a wire bow bent into a U-shape and passing through the peripheral meshes of the mesh structure and thereby holding the mesh structure tightened, the bow being fixed by brackets, bolts or the like at the support member which is formed by a hollow plastic frame and/or an essentially flat base plate. The opening of the luggage rack is in most cases formed at the top edge. There, the meshes of the mesh structure are held by an expandable string that is tightened between the free legs of the wire bow.

With this known construction, the production of the wire bow, the insertion of the wire bow into the mesh structure and the attachment of the wire bow at the support member incurs high material and assembly costs. Moreover, the wire bow significantly impairs the appearance of the luggage rack. When the wire bow engages a flat base plate, there is also a risk of injuries if, for example when the vehicle is suddenly braked; a passenger bumps with his knee against the relatively rigid wire bow. For this reason, the base plate is frequently formed with a peripheral bulge which surrounds the luggage rack, so that the wire bow is accommodated in a shallow depression of the base plate. In this case, however, a gap, which is difficult to clean, is formed between the peripheral bulge of the base plate and the wire bow. If the wire bow is accommodated in a hollow frame which itself engages the base plate, a gap, through which the mesh structure can pass through, must be formed between the frame and the base plate.

SUMMARY OF THE INVENTION

It is an object of the invention to provide a luggage rack of the type indicated above, in which the mesh structure is attached to the base member in a simple and safe manner.

According to the invention, this object is achieved by the feature that the net strings are drawn into holes of the support member and are fixed within these holes or beyond said holes on the back side of the support member.

Thus, according to the invention the mesh structure at the closed edges of the luggage rack is directly attached to the support member, so that a wire bow can be dispensed with. This eliminates also the cumbersome insertion of the wire bow through the meshes of the mesh structure and the attachment of the wire bow at the support member. Since the attachment points for the net strings are located in the holes of the support member or on the back side of the support member, they do not produce any risk of injuries and they do not impair the appearance of the luggage rack neither.

The invention also relates to a method of manufacturing a luggage rack, wherein the net strings are pressed into the holes of the support member in a loop configuration by means of punches.

The punches may be attached to a common mounting tool in such a manner that they extend radially outwardly from the tool and can be extended radially. Then, the mesh structure may be for example at first be placed in a flat configuration on a substrate and may then be picked up with the mounting tool. In this process, the mounting tool is applied such that each punch engages into a mesh that is located at the edge of the mesh structure and shall later be attached to the support member. When, then, the punches are extended, each punch grips with its distal end the net string of the corresponding mesh, so that the net can be picked up and can be held tightened by the punches. In this way, the mesh structure may be transferred onto the support member by means of the mounting tool. After the mounting tool, together with the mesh structure, has been lowered onto the support member, the punches are extended further so that they enter into the holes of the support member and thereby press the net strings in loop configuration into the holes of the support member.

Then, the net strings may for example be attached at the support member by hooking the loops at lugs that are formed in the holes or at the edge of the holes on the back side of the support member. If necessary, this process can be assisted by a tool applied from the back side of the support member.

Alternatively or in addition, the attachment of the net strings can also be achieved by welding the net strings to the support member.

If the attachment points for the net strings are located on the back side of the support member, then they may also be arranged at a smaller or larger distance from the holes of the support member. In this way, it is possible even in cases in which the edge of the luggage rack has bent portions and is offset from the nodes of the mesh structure, to compensate different mesh widths such that all net strings are held under essentially uniform tension.

In a preferred embodiment, the support member is a plate-like plastic molding having a raised edge that follows the contour of the luggage rack. In this case, the holes of the support member are preferably formed in the concave corners between the raised edge and the flat central portion of the plate, so that the punches may enter into these holes in an outwardly slanting direction. When injection molding the support member, the holes and, if necessary, also the lugs to which the net strings are hooked, can be formed by means of a simple molding die without moveable cores.

BRIEF DESCRIPTION OF THE DRAWINGS

Embodiments of the invention will now be explained in conjunction with drawings, wherein.

DETAILED DESCRIPTION

Figure 1:
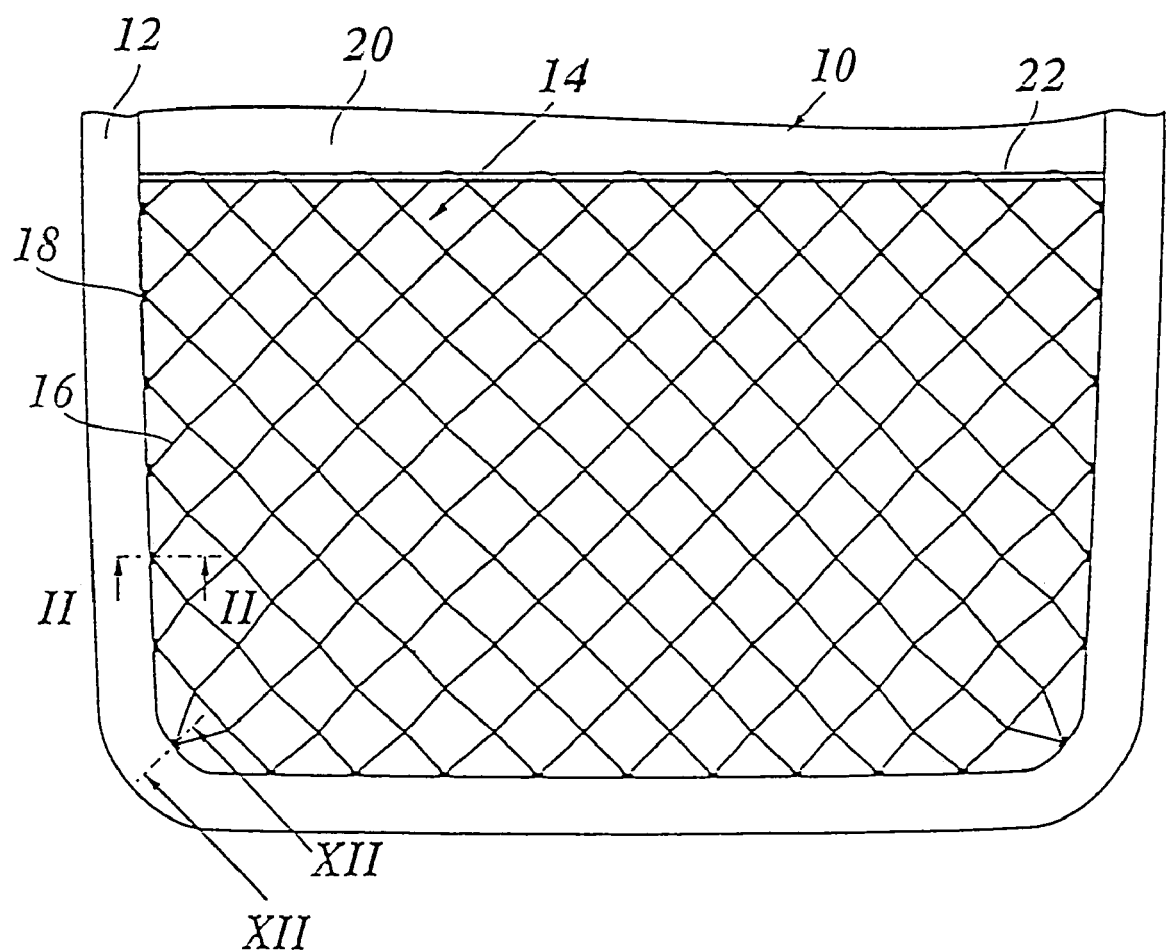
FIG. 1 is a plan view of a luggage rack.

The luggage rack shown in FIG. 1 comprises a support member 10 of which only a portion has been shown and which is formed by a plastic molding. A molded, slightly raised rim 12 of the support member embraces the luggage rack at both lateral sides and at the lower edge. A net forming the proper luggage rack is formed by a mesh structure 14 of net strings 16. The net strings 16 that form the meshes at the lateral edges and the lower edge of the mesh structure 14 enter into holes 18 that are formed in the concave corner between the flat central portion 20 of the support member 10 and the raised rim 12. These net strings 16 are attached on the back side of the support member 10 as will be described below in greater detail.

At the open top edge of the luggage rack, the mesh structure 14 is held by an expandable string 22 that is tightened between the two opposite lateral legs of the rim 12 and is attached there in any suitable way.

Figure 2:
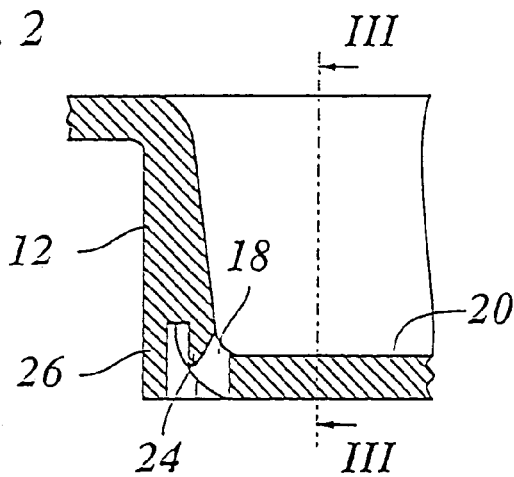
FIG. 2 is a section taken along the line II-II in FIG. 1.

FIG. 2 shows a partial cross section through the concave corner between the raised rim 12 and the flat central portion 20 of the support member 10 at the location of one of the holes 18. From the top edge of the hole 18, as seen in FIG. 2, a lug 24 projects downwardly, i.e. in the direction of the back side of the support member 10. This lug 24 is chamfered on the side facing towards the hole 18 and is surrounded with a spacing by a protective cap 26 that is formed in one piece with the rim 12 of the support member.

Figure 3:
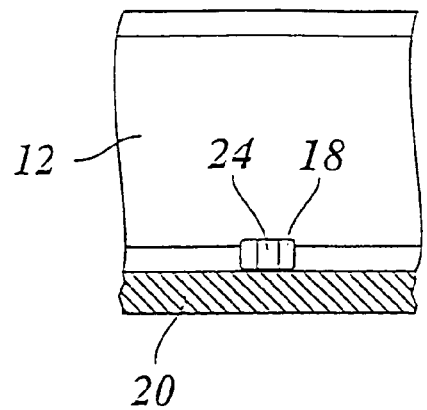
FIG. 3 is a section taken along the line III-III in FIG. 2.
Figure 4:
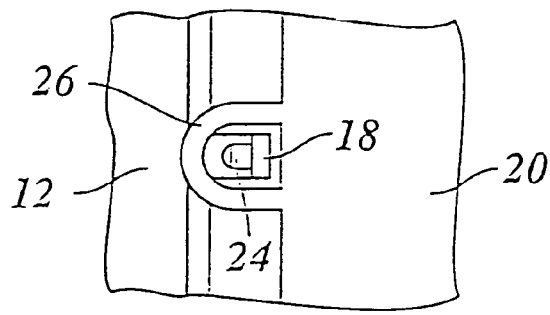
FIG. 4 is a bottom view of the detail of the luggage rack shown in FIG. 2.

As is shown in FIGS. 3 and 4, the lug 24 has a smaller width than the rectangular hole 18.

Figure 5:
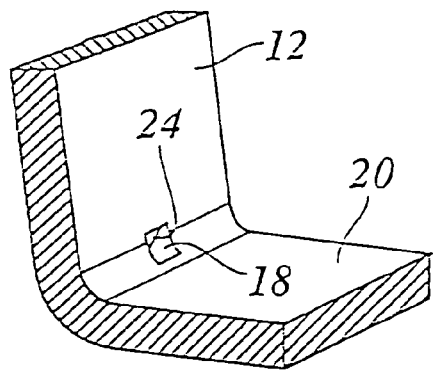
FIG. 5 is a perspective view of the detail shown in FIGS. 2 to 4.
Figure 6:
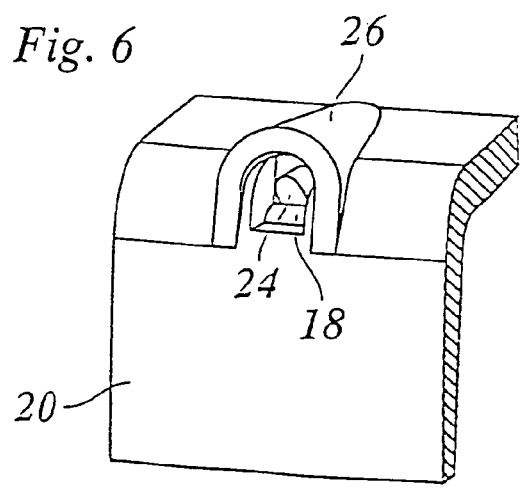
FIG. 6 is a perspective bottom view of the detail shown in FIGS. 2 to 5.

FIGS. 5 and 6 represent the three-dimensional configuration of the hole 18, the lug 24 and the protective cap 26. These elements have such a shape that they can readily be withdrawn from the die in the injection molding process for forming the support member 10.

Figure 7:
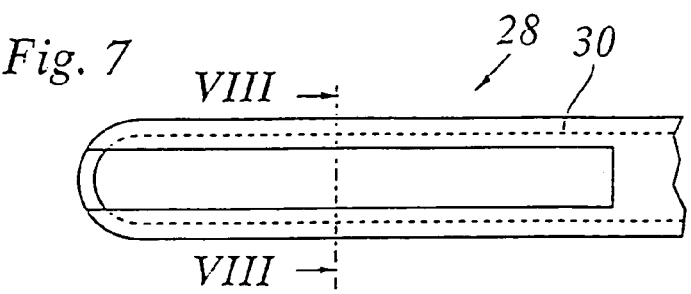
FIG. 7 is a view of a punch for manufacturing the luggage rack according to FIG. 1.
Figure 8:
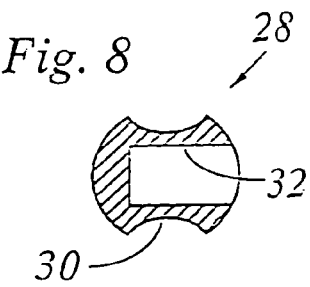
FIG. 8 is a section taken along the line VIII-VIII in FIG. 7.

For attaching the mesh structure 14 to the support member 10, each net string 16 adjacent to one of the holes 18 is drawn into this hole and hooked on the lug 24. A punch 28 of the type shown in an enlarged scale in FIGS. 7 and 8 is employed for this.

The punch 28 is shaped as an elongate rod having a round cross section and a rounded end. A guide groove 30 having a semi-circular cross section extends continuously along two diametrically opposed generatrices of the punch 18 and over the rounded end. In a position that is angularly offset from the two legs of the guide groove 30 by 90°, an end portion of the punch 28 has a deeper groove 32 that is open towards the rounded end.

Figure 9:
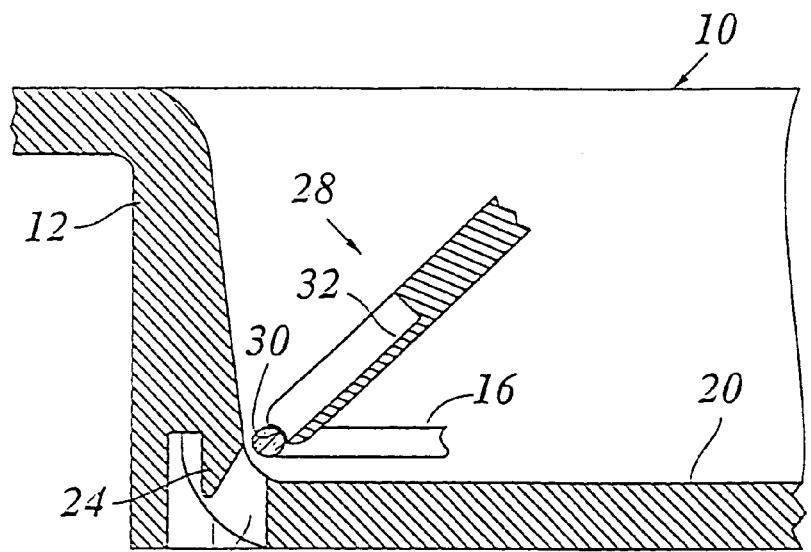
FIGS. 9 to 11 are enlarged sectional views corresponding to FIG. 2, for illustrating a method of manufacturing the luggage rack.
Figure 10:
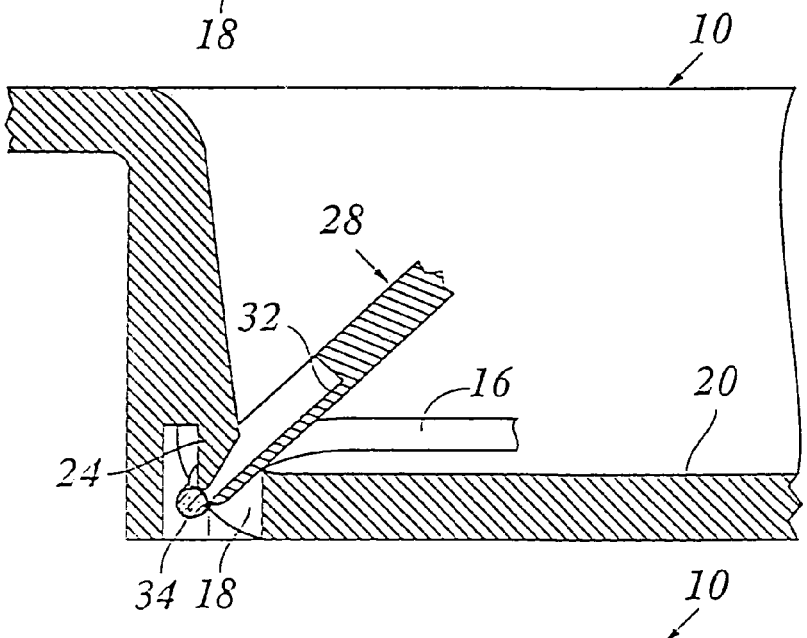
Figure 11:
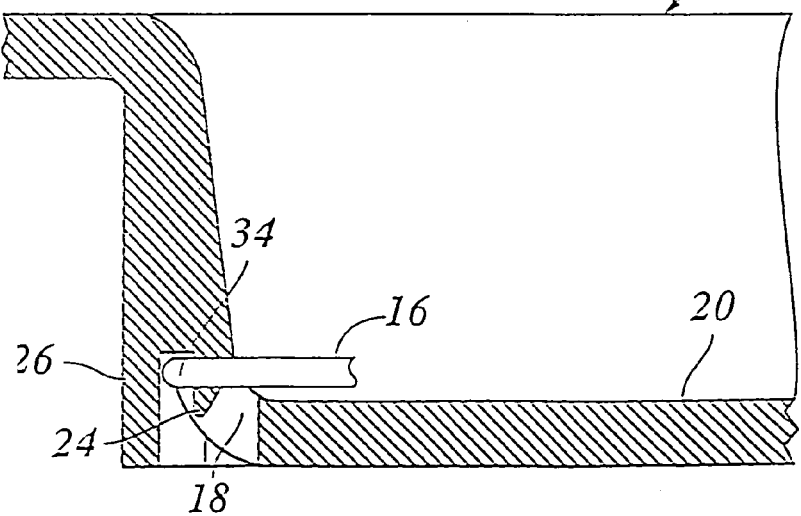

The process of inserting a net string 16 into the hole 18 and hooking the net string on the lug 24 has been illustrated in FIGS. 9 to 11.

In the condition shown in FIG. 9, the net string 16 defining the external contour of a mesh at the edge of the mesh structure 14 is still located in its entirety on the front side of the support member 10. The rounded tip of the punch 28 engages the net string 16 which is held by the guide groove 30 passing over this rounded tip. The net sting of each peripheral mesh of the mesh structure 14 is held in an analogous way by a corresponding punch 28. When all punches 28 are inclined outwardly relative to the mesh structure and when the central portion of the mesh structure is pulled by means of a tension member, all net strings 16 are firmly held in engagement with the tips of the punches 28, so that the mesh structure 14 can be held in a tensioned state and can be manipulated by means of the punches 28.

Subsequently, the punches 28 are extended in the direction of their respective longitudinal axes, as is shown in FIG. 10. Thus, the punches 28 enter with their tips into the holes 18, and the net strings 16 form loops 34 and are also inserted into the holes 18. The lug 24 slides over the tip of the loop 34 and is then received in the groove 32 of the punch 28. Optionally, the lug 24 may experience a slight elastic deflection.

Since the tips of all punches 28 are moved outwardly, a tensional stress is generated in the mesh structure. When, subsequently, the punches 28 are withdrawn again, the loops 34 of the net strings 16 are held back by the lugs 24, and, due to the tensional stress, each loop 34 is drawn firmly round the corresponding lug 24, as has been shown in FIG. 11. The protective cap 26 prevents the loop 34 from being stripped off from the lug 24. Since the lug 24 projects in the direction of the back side of the support member 10, the loops 34 remain in firm engagement with the corresponding lugs, even when the mesh structure 14 is forwardly (upwardly in FIG. 11) drawn off from the support member 10.

In the embodiment described above, the punches 28 may extensibly be supported at a carrier, which has not been shown. This carrier may also be used for picking up the mesh structure 14, that is originally spread on a suitable substrate, by means of the punches and transferring it onto the support member 10.

In another variant of the method, it is possible that the mesh structure 14 is at first placed onto the flat central portion 20 of the support member 10 and that a carrier to which the punches 28 are pivotally or flexibly mounted is then lowered onto the support member 10 such that the tips of the punches 28 enter into the peripheral meshes of the mesh structure 14 and are then supported on the surface of the support member 10. When the carrier is lowered further, the punches 28 are tilted or bent outwardly so that they engage the net strings 16 and push them ahead until they finally are inserted into the holes 18. Since the punches 28 are progressively tilted into a horizontal position in this process, the loops 34 are lifted and hooked onto the lugs 24 after they have entered into the holes 18.

Figure 12:
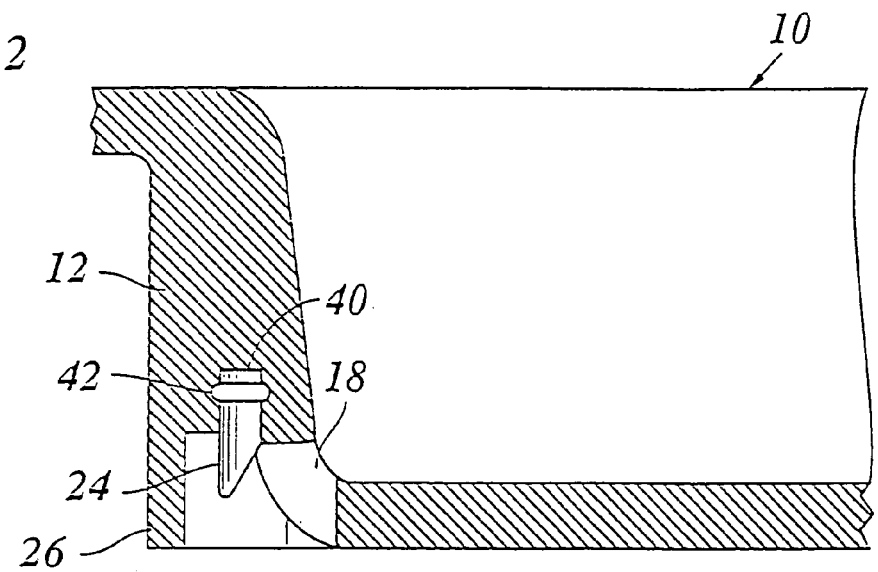
FIG. 12 is an enlarged section along the line XII-XII in FIG. 1.

As is shown in FIG. 1, the holes 18 of the support member 10 are approximately aligned on vertical and horizontal lines which interconnect the nodes of the mesh structure 14. Thus, the peripheral meshes of the luggage rack are held in the desired shape by the lugs 24, and the net strings 16 have a suitable tension. However, due to a slightly bent path of the rim 12, there occur local positional deviations between the holes 18 and the ideal positions of the nodes of the net. FIG. 12, illustrates a possibility to compensate these positional deviations by arranging the lugs 24 at a larger distance from the hole 18 or, more precisely, at a larger distance from the mouth of the hole 18 on the front side of the support member. In this way, it is possible to hold the net strings 16 under suitable tension even in the rounded corner portions of the luggage rack, for example.

In the simplest case, the loops 34 can be prevented from slipping off from the lugs 24 just by a suitable tensional strain of the mesh structure 14 (when the luggage rack is empty) and/or by making the holes 18 comparatively narrow. When the luggage rack is filled, the expendable string 22 permits the mesh structure to comply. Optionally, the loops 34 may be additionally secured in their hooked-on positions at the lugs 24 by pressing plugs (not shown) into the holes 18 from the back side of the support member 10 (from the bottom side in FIG. 12).

Figure 13:
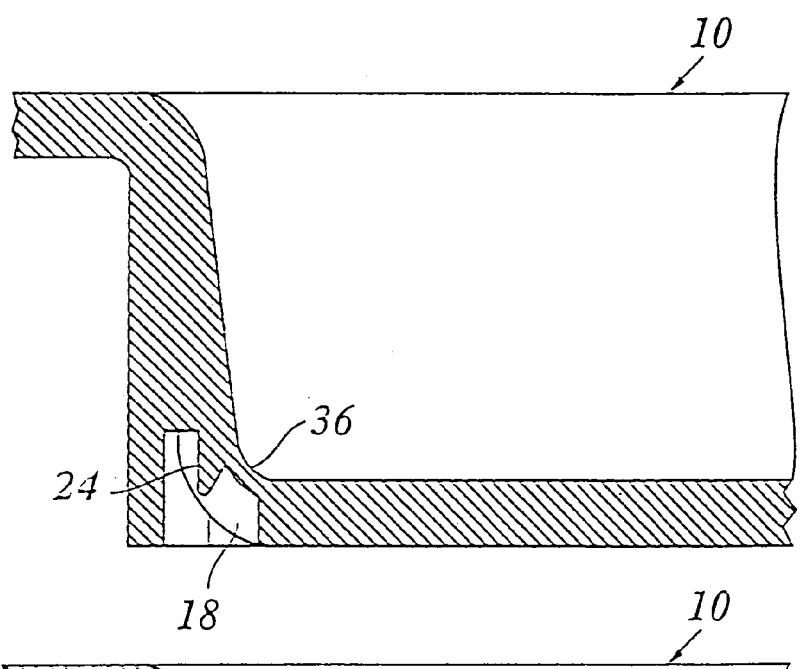
FIG. 13 is a sectional view similar to FIG. 2, illustrating a modified embodiment of the luggage rack.

FIG. 13 shows a modified embodiment of the luggage rack, in which the mouths of the holes 18 on the front side of the support member 10 are originally closed-off by a molded break-off portion 36. When the mesh structure 14 is applied, these break-off portions 36 are pierced by the punches 28, so that the loops 34 can again be inserted into the holes 18 and hooked on the lugs 24 as described above. This embodiment has the advantage that the holes 18 remain closed and invisible when the support member 10 is used only as the back wall of a seat shell without luggage rack.

Figure 14:
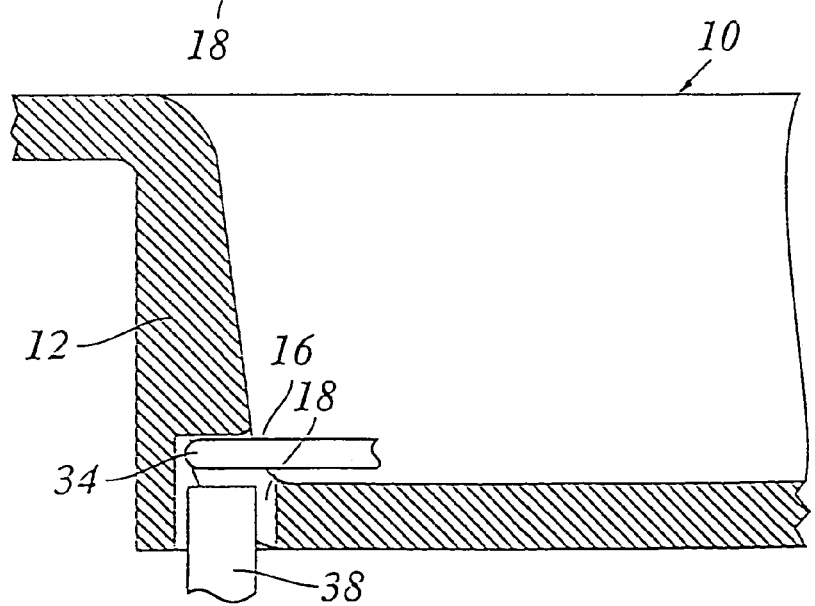
FIG. 14 is a sectional view similar to FIG. 2, illustrating another method of manufacturing the luggage rack.

FIG. 14 illustrates an embodiment in which the net strings are not hooked at lugs but are welded to the internal face of the corresponding hole 18 through thermal or supersonic welding. After the net strings have been inserted into the holes 18, for example by means of punches and with formation of loops as described above, a heating pin or a sonode 38 is inserted into the hole 18 from the back side of the support member 10. i.e. from the bottom side in FIG. 14, and the net string is welded to the top wall of the hole 18, which top wall is arranged horizontally in FIG. 14. In order to prevent the net string 16 from being welded to the sonode 38, the sonode may be coated with teflon. The same holds true for the heating pin. If the net string itself is not formed of a thermoplastic material, it may be welded into the plastic material of the support member.

This welding process may optionally be combined with the previously described method, so that the loops 34 formed by the net strings 16 and hooked on the lugs 24 are additionally welded. Likewise is it possible that a pin corresponding to the sonode 38 is just used for pushing the net string 26 onto the lug 24. When the punch 28 has a fork-shaped configuration at its distal end, it is also possible to insert a pin from below through the loop 34 into the rim 12 of the support member and then to leave the pin permanently in the support member. This possibility has been illustrated in FIG. 12, where the lug 24 is formed by a pin 40 that is provided with a snap-in boss 42 and is pressed into an opening of the support member 10 from below.

Instead of pressing the net strings 16 into the holes 18 by means of punches, it is also possible in a modified variant of the method to suck the net strings into the holes 18 by means of subatmospheric pressure.

The invention claimed is:

1. A method of manufacturing a luggage rack, including a support member, the support member including a back side and closed edges having holes, and a netting arranged in parallel with the support member and being formed by net strings that are attached to the support member at the closed edges of the luggage rack, the net strings including loops drawn into the holes of the support member, the loops being secured to the support member by one of the following arrangements:
   a) the support member includes projections associated with the holes and the loops are suspended about the projections associated with said holes, and
   b) the loops are welded to the support member, the method comprising the steps of:
   engaging the net strings of the netting by free ends of pin-shaped punches,
   inserting the engaged net strings into the holes in a loop configuration, and
   one of:
   a) suspending the loops on the projections, and
   b) welding the loops to the support member.

2. The method of claim 1, wherein the punches each have a guide groove for receiving the net string, said guide groove passing over a distal end of the punch, each punch further having a longitudinal groove extending longitudinally of the punch and at right angles to the guide groove and open towards the distal end of the punch, and further comprising the step of pushing the net strings, after they have been inserted into the holes, over a projection of the support member with the distal end of the punch, until the projection enters into the longitudinal groove of the punch and engages into the loop formed by the net string.

3. The method of claim 1, wherein
the support member has a flat central portion and a rim raised relative to the central portion, and
the holes are each formed in a concave corner between the rim and the flat central portion.

4. The method of claim 3,
wherein the luggage rack includes an open edge, and
further comprising an expandable string for holding the netting at the open edge of the luggage rack, the expandable string being tightened between opposite legs of the raised rim of the support member.

5. The method of claim 1, wherein
the projection is formed one of:
in an interior of the respective hole, and
at an edge of the respective hole, and
the projection projects with a distal end thereof towards the back side of the support member.

6. The method of claim 5, further comprising a protective cap which surrounds the projection with a spacing.

* * * * *